US011907348B2

(12) United States Patent
Mori

(10) Patent No.: US 11,907,348 B2
(45) Date of Patent: Feb. 20, 2024

(54) IDENTIFICATION SYSTEM DEVICE

(71) Applicant: Tsutomu Mori, Osaka (JP)

(72) Inventor: Tsutomu Mori, Osaka (JP)

( * ) Notice: Subject to any disclaimer, the term of this patent is extended or adjusted under 35 U.S.C. 154(b) by 323 days.

(21) Appl. No.: 17/375,935

(22) Filed: Jul. 14, 2021

(65) Prior Publication Data

US 2022/0374504 A1  Nov. 24, 2022

(30) Foreign Application Priority Data

May 20, 2021  (JP) .................. 2021-085208

(51) Int. Cl.
*G06F 21/32* (2013.01)
*H04L 9/32* (2006.01)
*G10L 17/00* (2013.01)
*G10L 25/51* (2013.01)
*H04L 9/06* (2006.01)
*H04L 9/00* (2022.01)

(52) U.S. Cl.
CPC .............. *G06F 21/32* (2013.01); *G10L 17/00* (2013.01); *G10L 25/51* (2013.01); *H04L 9/0643* (2013.01); *H04L 9/3231* (2013.01); H04L 9/50 (2022.05)

(58) Field of Classification Search
CPC .......... G06F 21/32; G06F 21/31; G06F 21/60; G06F 21/62; G06F 21/6245; G06F 21/6254; G10L 17/00; G10L 25/51; H04L 9/0643; H04L 9/3231; H04L 9/50
See application file for complete search history.

(56) References Cited

U.S. PATENT DOCUMENTS

| 2017/0323644 | A1* | 11/2017 | Kawato | ................... G10L 17/24 |
| 2020/0296510 | A1* | 9/2020 | Li | ......................... H04R 1/1083 |
| 2022/0004608 | A1* | 1/2022 | Singh | ..................... H04L 9/3236 |
| 2022/0129481 | A1* | 4/2022 | Galindo | ................ H04L 63/108 |
| 2022/0310058 | A1* | 9/2022 | Zhao | ...................... G10L 17/22 |

FOREIGN PATENT DOCUMENTS

CN         6394709 B2    9/2018

* cited by examiner

*Primary Examiner* — Malcolm Cribbs
(74) *Attorney, Agent, or Firm* — THE MARBURY LAW GROUP, PLLC

(57) ABSTRACT

An identification system device includes an identification element processing unit that generates identification elements based on sound information including a frequency of a sound source or a frequency of a sound. An ID conversion processing unit that generates an ID based on the sound information, an information generation processing unit generates identification information by associating the ID with the identification elements, a memory unit stores the identification information, and a judgment unit compares the identification information with newly generated identification elements to determine whether or not both are the sound information from the same sound source. The ID conversion processing unit generates the new ID related to the ID when the determination was the sound information from the same sound source, and the information generation processing unit generates a new identification information by associating the new ID with the newly generated identification elements.

13 Claims, 5 Drawing Sheets

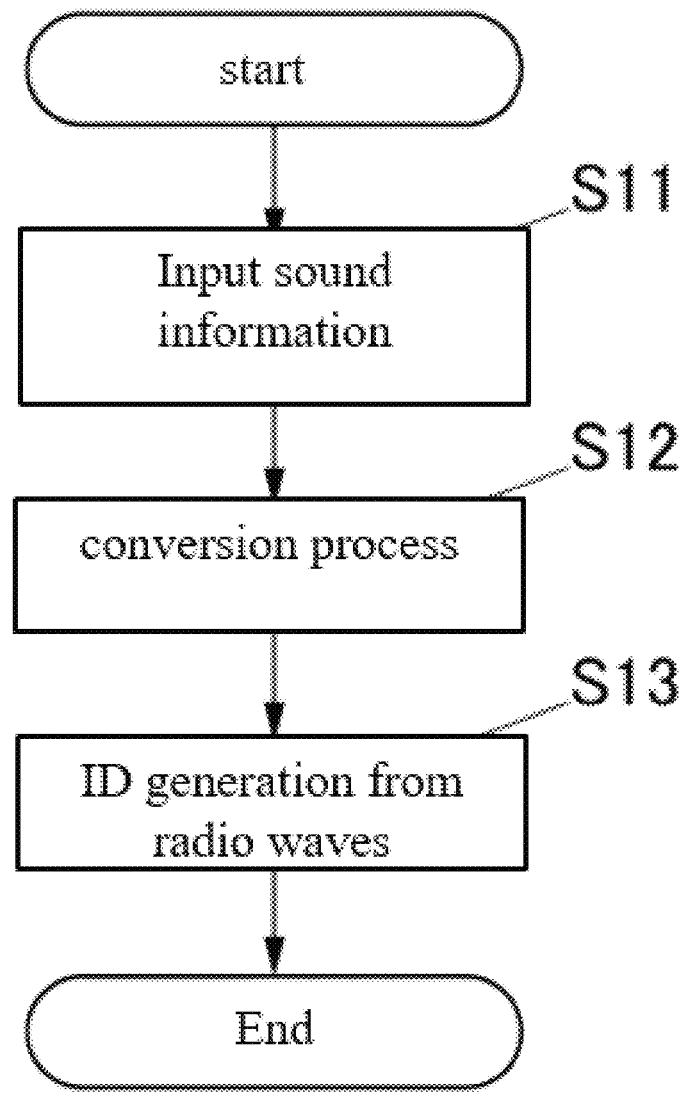

FIG.3

| Transaction TP | ID No. | ID element A | ID element B | ID element C | ID element D |
|---|---|---|---|---|---|
| Transaction $TP_1$ | $ID_1$ | ID element A1 | ID element B1 | ID element C1 | ID element D1 |
| Transaction $TP_2$ | $ID_2$ | ID element A2 | ID element B2 | ID element C2 | ID element D2 |
| Transaction $TP_3$ | $ID_3$ | ID element A3 | ID element B3 | ID element C3 | ID element D3 |
| ..... | ..... | ..... | ..... | ..... | ..... |
| Transaction $TP_{n-1}$ | $ID_{n-1}$ | ID element $A_{n-1}$ | ID element $B_{n-1}$ | ID element $C_{n-1}$ | ID element $D_{n-1}$ |
| Transaction $TP_n$ | $ID_n$ | ID element $A_n$ | ID element $B_n$ | ID element $C_n$ | ID element $D_n$ |
| ..... | ..... | ..... | ..... | ..... | ..... |

20

IDENTIFICATION SYSTEM DEVICE

CROSS-REFERENCE TO RELATED APPLICATION

This application is based upon and claims the benefit of priority under 35 USC 119 of Japanese Patent Application No. 2021-085208 filed on May 20, 2021, the entire disclosure of which, including the description, claims, drawings, and abstract, is incorporated herein by reference in its entirety.

BACKGROUND OF THE INVENTION

Field of the Invention

The present invention relates to an identification (ID) system using sound data information, which is composed of the frequency of a sound source or the frequency of a sound emitted from the sound source.

Description of the Related Art

Traditionally, an identification system device that performs identification based on sound source information and sound information emitted from a sound source has been provided. For example, the speaker identification device disclosed in Japanese Patent No. 6394709 registers a score indicating the degree of similarity between the voice recognition means for extracting the text data corresponding to the registered voice and the extracted text data and the registered text data. It is provided with a registered voice evaluation means calculated for each person and a dictionary registration means for registering the feature amount of the registered voice in the speaker identification dictionary according to the evaluation of the registered voice evaluation means. The speaker is identified by collating this feature amount.

In the above, in the conventional voice recognition system device, the registered speaker needs to read the preset text data aloud, which makes the registration work complicated. Then, in order to improve security, the set text data may be read aloud a plurality of times.

SUMMARY OF THE INVENTION

The purpose of the present invention is to provide an identification system device that does not need to read and register text data in advance, can be easily used, and has improved security.

According to an aspect of the present invention, there is provided an identification system device having an identification element processing unit that generates a plurality of identification elements based on sound information including a frequency of a sound source or a frequency of a sound emitted from the sound source, an ID conversion processing unit that generates an ID based on the sound information, an information generation processing unit that generates identification information by associating the ID with a plurality of the identification elements, a memory unit that stores the identification information, and a judgment unit that compares the identification information stored in the memory unit with a plurality of newly generated identification elements to determine whether or not both are the sound information from the same sound source, wherein the ID conversion processing unit generates the new ID related to the ID of the identification information stored in the memory unit determined to be the same sound source when it was determined that the determination in the judgment unit was the sound information from the same sound source, and wherein the information generation processing unit generates the new identification information by associating the new ID with the plurality of newly generated identification elements.

According to the present invention, it is not necessary to readout and register text data in advance, and it is possible to provide an identification system device that can be easily used and has improved security.

BRIEF DESCRIPTION OF THE SEVERAL VIEWS OF THE DRAWINGS

FIG. 2 is a flow chart showing processing of an ID conversion processing unit of the identification system device according to the embodiment of the present invention.

FIG. 3 is an explanatory diagram showing a transaction configuration performed by an information generation processing unit of the identification system apparatus according to the embodiment of the present invention.

DETAILED DESCRIPTION OF THE PREFERRED EMBODIMENT

Figure 1:
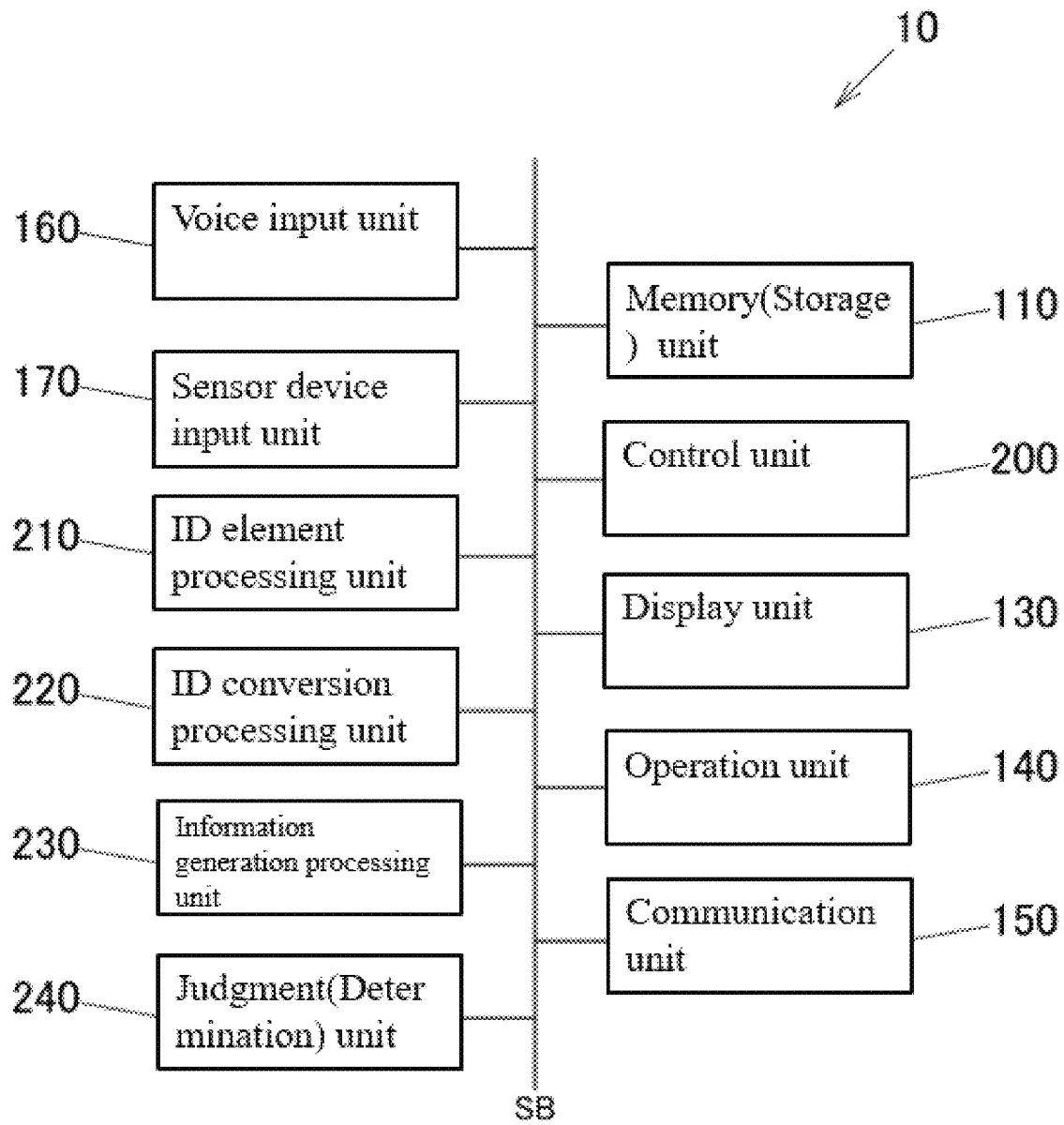
FIG. 1 is a functional block diagram showing a configuration of an identification system device according to an embodiment of the present invention.

Hereinafter, an embodiment of the present invention is described in detail with reference to the attached drawings. FIG. 1 is the block diagram showing a configuration of the identification (ID) system device 10. The ID system device 10 includes a control unit 200, an ID element processing unit 210, an ID conversion processing unit 220, an Information generation processing unit 230, a Judgment (determination) unit 240, and a Memory unit 110. The Memory unit 110 is connected to the control unit 200, the ID element processing unit 210, the ID conversion processing unit 220, the information generation processing unit 230, and the Judgment (determination) unit 240 via the system bus SB. And the Memory unit 110 is composed of, for example, an SSD (Solid State Drive) or an SRAM (Static Random Access Memory). And the Memory unit 110 stores a control program (program) and a plurality of identification information generated by the information generation processing unit 230.

The control unit 200, the ID element processing unit 210, the ID conversion processing unit 220, the information generation processing unit 230, and the judgment unit 240 are functional blocks that make the CPU(also called a processor, or a computer) function by executing the control program stored in the memory(storage) unit 110.

The control unit 200 is connected to the display unit 130, the operation unit 140, the communication unit 150, the voice input unit 160, and the sensor device input unit 170 via the system bus SB. Then, the control unit 200 controls each unit. The display unit 130 is, for example, a display. The operation unit 140 is, for example, like a keyboard. The communication unit 150 is, for example, a network interface controller (NIC). And then, the communication unit 150 can transmit communication data to a server or the like. The voice input unit 160 is, for example, like a microphone. The sensor device input unit 170 is connected to various sensors such as a pressure sensor and a vibration sensor, and is input as a sound signal.

The ID element processing unit 210 generates a plurality of ID elements based on the information of the sound source, or the sound information including the information of the sound emitted from the sound source. In the case of a person, the sound source is a vocal cord (throat) that emits a voice. The possession of the sound source is not limited to humans, and may be other creatures such as animals and fish.

Examples of the plurality of ID elements generated by the ID element processing unit 210, are processed by the identification (ID) elements A to D. Details are described below and refer to FIG. 3.

The ID element A represents what kind of frequency characteristics the phonemes of the sound emitted by the sound source have, and can be an acoustic model formed by using a hidden Markov model. The sound is input from the voice input unit 160. When the vibration of the sound source is used, a signal from the vibration detector that detects the vibration of the vocal cords of a human (animal) is input via the sensor device input unit 170.

The ID element B analyzes and models intonation and accent. It can also make brain activity signals to intonation and accent elements. It analyzes intonation and accent from the sound input from the voice input unit 160. The brain activity signal is input from a brain wave acquisition device attached to a human (animal) via the sensor device input unit 170.

The ID element C is an element model of physical characteristics that affect pronunciation. It indicates the strength of exhaled breath during pronunciation and the vibration of the skeleton. Then, signals from a pressure sensor (detection of the strength of exhaled breath) and a vibration sensor (detection of vibration of the skeleton) attached to a person (animal) are input via the sensor device input unit 170. It can also take into account brain activity signals (Similar to identification element B).

The ID element D is an ID (identification) element other than the identification elements A to C, which is generated based on sound information. It refers to non-sound elements such as knowledge elements (e.g., PINs), possession elements (e.g., card keys), biometrics (e.g., fingerprint authentication).

The ID conversion processing unit 220 generates(makes) an ID based on the sound information. For example, it can convert the frequency of a sound into a wavelength and use the wavelength at a predetermined time to generate a predetermined number of digits of ID. When a sound source is used, the wavelength of the longitudinal wave and the wavelength of the transverse wave can be calculated from the vibration of the sound source, and the ID can be generated by multiplying them a plurality of times. The ID conversion processing unit 220 generated thereby can be an ID having 30 billion digits or more as an initial value.

The flow chart of FIG. 2 is an example of the operation in the ID conversion processing unit 220. First, in step S11, the input sound information conversion process is performed. In particular, when the sound information is voice, the frequency of the voice is extracted and converted into wavelength. Second, in step S12, the wavelength processed and generated in step S11 is converted into radio waves. Thirdly, in step S13, an ID is generated from the wavelength converted into radio waves in step S12.

The radio wave generated in step S12 can be transmitted to another device by the communication unit 150, and the process of step S13 can be performed by the other device.

Further, the ID conversion processing unit 220 can generate a new ID in association with the ID of the identification information 20 already stored in the memory unit 110. The newly created ID can maintain continuity with the existing ID. The number of digits of the new ID is added to the existing ID. It can be over 100 billion digits.

The information generation processing unit 230 generates the identification information 20 by associating the ID generated by the ID conversion processing unit 220 with the identification elements A to C and the identification element D generated based on the sound information by the ID element processing unit 210 (refer to FIG. 3). The ID information 20 is executed by a transaction. For example, the transaction TP1 is information including the $ID_1$ generated by the ID conversion processing unit 220 and the identification elements $A_1$ to $D_1$ generated by the ID element processing unit 210.

Figure 4:
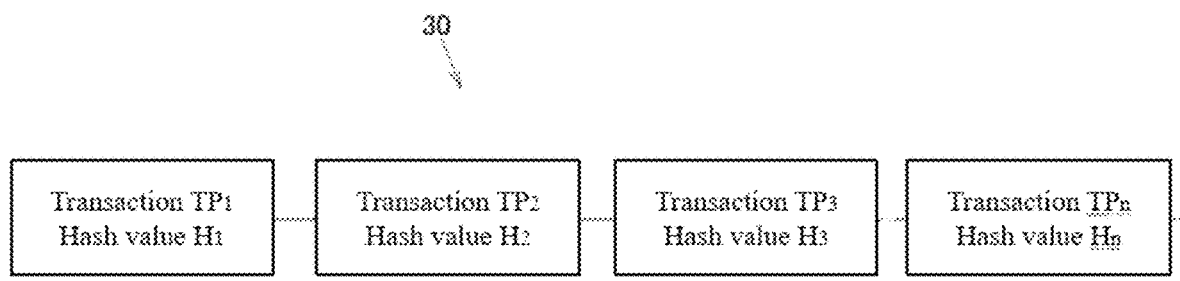
FIG. 4 is an explanatory diagram showing a state in which the information generation processing unit of the identification system apparatus according to the embodiment of the present invention stores recognition information in the form of a blockchain.

The information generation processing unit 230 is stored in the memory unit 110 in the form of a blockchain (refer to FIG. 4). Each block of the blockchain 30 includes a transaction TPn and a hash value Hn.

The judgment unit 240 determines whether both are sound information from the same sound source by comparing the identification elements A to D in the identification information 20 stored in the memory unit 110 with a plurality of identification elements A to D newly generated by the ID element processing unit 210. When sound information is newly input to the identification system device 10, the ID element processing unit 210 newly generates a plurality of identification elements A to D. For example, in the determination of whether or not the sound sources are the same, a plurality of newly generated identification elements A to D are compared with the identification elements A to D of the identification information 20 stored in the memory unit 110, and if the degree of similarity is high, it is determined that both are sound information from the same sound source (the same person if it is a person).

The judgment unit 240 can calculate the degree of similarity between the two, and if it is equal to or greater than a predetermined threshold value, it can be determined that the sound sources are the same. Not only when the identification elements A to D to be compared are the same, but also in a similar range. Therefore, for example, a person is determined to be the same person even if changes over time (voice change, etc.) or voice changes due to external factors (when the skeleton or vocal cord morphology changes due to surgery, etc.).

Figure 5:
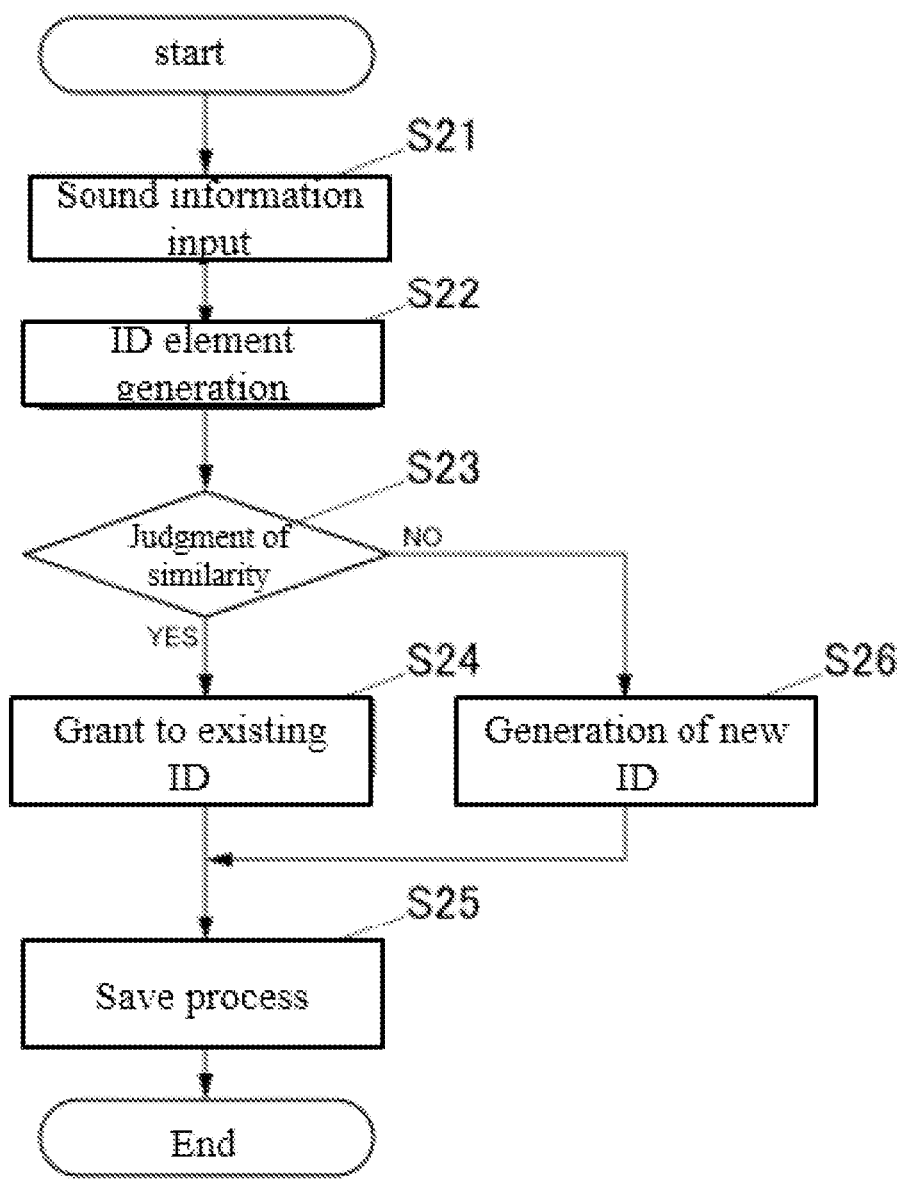
FIG. 5 is a flow chart showing processing of the identification system apparatus according to the embodiment of the present invention.

The identification system device 10 (FIG. 1) formed in this way can be configured by a PC (Personal Computer) including a personal digital assistant (smartphone) and a tablet PC. Further, the identification system device 10 can be formed by not only one mobile information terminal (smartphone) or PC but also the configuration of the identification system device 10 distributed in a plurality of crises and connected by a network. The identification system device 10 operates according to the flow chart shown in FIG. 5.

First, in step S21, sound information including the frequency of the sound source or the frequency of the sound emitted from the sound source is input. For example, in the case of a voice pronounced by a person or an animal as the frequency of the sound emitted from the sound source, the voice is input to the identification system device 10 via the voice input unit 160. In the case of the frequency of the sound source as the frequency of the sound source, the vibration detected by the vibration sensor attached to the sound source is input to the identification system device 10 as the frequency as the frequency via the sensor device input unit 170.

Second, in step S22, the ID element processing unit 210 generates a plurality of ID elements A to C based on the input sound information. The ID element D (identification element other than the ID elements A to C generated based on the sound information) is generated when there is an input by another input means.

Thirdly, in step S23, the judgment unit 240 determines whether both are sound information from the same sound source by comparing the identification elements A to C of the identification information 20 already stored in the memory unit 110 with the identification element newly generated by inputting the sound information from the voice input unit 160 or the sensor device input unit 170. When the identification element D which is an identification element other than sound information is input, the judgment unit 240 compares the identification element D of the identification information 20 already stored in the memory unit 110 with the newly input and generated identification element D, and uses it as a determination material for the determination.

Regarding the determination in the judgment unit 240, it is identified that the sound information is not from the same sound source. That is, if it is determined that the person is another person, the process proceeds to step S26, and the ID conversion processing unit 220 generates a new ID. Next, in step S25, the information generation processing unit 230 generates a new ID.

Then, the newly generated ID elements A to D are associated with each other to generate the identification information 20, which is stored in the memory unit 110.

In the initial state in which the identification information 20 is not stored in the memory unit 110, the processes of steps S26 and S25 are executed without executing the process of step S23.

When the determination in the judgment unit 240 determines that the sound information is from the same sound source, the process proceeds to step S24, and the ID conversion processing unit 220 executes addition processing to the existing ID (New ID generation). Which means, a new ID related to the ID of the identification information 20 determined to be the same sound source is generated. A new ID can be generated by adding the number of digits to the number of digits of the ID of the identification information 20 determined to be the same sound source. Then, a plurality of IDs determined to be the same sound source are associated with each other.

Then, the process proceeds to step S25. The information generation processing unit 230 associates the newly generated ID with the newly generated identification elements A to D to generate new identification information 20 and stores it in the memory unit 110.

In this way, the identification system device 10 can determine whether or not the sound information is the same, and recognize whether or not they are the same person (creature). In the identification system device 10, it is not necessary to read out and register the text data in advance, and the text data can be easily used and the security can be improved.

The identification system device 10 can be used in combination with various devices. For example, the system device 10 can be used in combination with the customer service system device. The customer service system device is a system that proposes the optimum products and services that the user currently seeks from the data of the products and the like that the user has purchased in the past.

For example, a store employee is associated with the ID of the user simply by inputting the voice of the user who is the customer from the smartphone provided with the identification system device 10. Then, it extracts data on products purchased in the past, desired products, hobbies, and tastes, and analyzes the data and information on the products newly requested by the user (a customer) at the present time. As a result, it is possible to propose products and services that the user (a customer) wants at the present time.

The identification system device 10 can also be used for animals other than humans. In this case, the sound emitted by the sound source can include ultrasonic waves. That means, it can be applied to the management of livestock animals in ranches and the management of domestic animals (creatures that emit ultrasonic waves) in aquariums, zoos, and the like.

In addition, since it is not necessary to read a specific text aloud, it does not depend on the language, and it can be applied to people who cannot read characters, blind people, and Alzheimer's patients (Emotional signal from brain waves). Therefore, the identification system device 10 can also be used in miscellaneous schools, long-term care facilities, etc.

For example, in the case of a blind person, by combining with other systems, it is possible to understand who is speaking.

In addition, the identification system device 10 can also be linked to a public personal number introduced by the government or etc. As a result, it can be applied to payment of taxes, payment of social insurance, receipt of benefits, and the like.

Further, the identification system device 10 can be combined with a voice characterization system or a translation system.

In the identification system device 10, since the determination is performed by the ID and a plurality of authentication elements associated with the ID, it is not necessary to input personal information, and the security is high. Personal information is gender, age, place of residence and other personal information. Then, since the ID and a plurality of authentication elements associated with the ID are stored as transactions as authentication information, a robust system (as means) can be constructed. And, since the authentication information is stored in the form of a blockchain, it has a higher level of security. In addition, since it is possible to authenticate the person even if the voice quality changes due to voice change or aging or plastic surgery is performed, the system can be simple and highly secure.

While the embodiments of the invention have been described heretofore, the embodiments are presented as examples, and hence, there is no intention to limit the scope of the invention by the embodiments. These novel embodiments can be carried out in other various forms, and various omissions, replacements and modifications can be made to the embodiments without departing from the spirit and scope of the invention. Those resulting embodiments and their modifications are included in the spirit and scope of the invention and are also included in the scope of inventions claimed for patent under claims below and their equivalents.

What is claimed is:
1. An identification system device comprising:
a memory unit configured to store identification information;
a processor coupled to the memory unit and configured to:

generate a plurality of identification elements based on sound information including a frequency of a sound source or a frequency of a sound emitted from the sound source;

generate an identification (ID) based on the sound information;

generate the identification information by associating the ID with a plurality of the identification elements, wherein the identification elements include at least one of an intonation of the sound source, an accent of the sound source, brain activity of the sound source, or a strength of exhaled breath of the sound source;

compare the identification information stored in the memory unit with a plurality of newly generated identification elements to determine whether or not both are sound information from the same sound source, and wherein in response to the processor determining that both are source information from the same sound source, the processor is configured to generate a new ID related to the ID of the identification information stored in the memory unit determined to be the same sound source, and the generate a new identification information by associating the new ID with the plurality of newly generated identification elements.

2. The identification system device according to claim 1, wherein the processor is configured to generate the ID based on the sound source related to the sound information or the frequency of the sound emitted from the sound source.

3. The identification system device according to claim 1, wherein the plurality of identification elements includes an identification element composed of a knowledge element, a possession element, or a biological element, in addition to an identification element generated based on the sound information.

4. The identification system device according to claim 2, wherein the plurality of identification elements include an identification element composed of a knowledge element, a possession element, or a biological element, in addition to an identification element generated based on the sound information.

5. The identification system device according to claim 1, wherein the identification information is executed by a transaction.

6. The identification system device according to claim 2, wherein the identification information is executed by a transaction.

7. The identification system device according to claim 3, wherein the identification information is executed by a transaction.

8. The identification system device according to claim 4, wherein the identification information is executed by a transaction.

9. The identification system device according to claim 5, wherein the processor is configured to store the identification information including the transaction in the memory unit in a form of a blockchain.

10. The identification system device according to claim 6, wherein the processor is configured to store the identification information including the transaction in the memory unit in a form of a blockchain.

11. The identification system device according to claim 7, wherein the processor is configured to store the identification information including the transaction in the memory unit in a form of a blockchain.

12. The identification system device according to claim 8, wherein the processor is configured to store the identification information including the transaction in the memory unit in a form of a blockchain.

13. An identification system device, comprising:

a memory unit that stores identification information; and a processor coupled to the memory unit and configured to:

generate a plurality of identification elements based on sound information including a frequency of a sound source or a frequency of a sound emitted from the sound source;

generate an identification (ID) based on the sound information;

generate the identification information by associating the ID with a plurality of the identification elements;

compare the identification information stored in the memory unit with a plurality of newly generated identification elements to determine whether or not both are the sound information from the same sound source;

generate the new ID related to the ID of the identification information stored in the memory unit determined to be the same sound source in response to determining that the sound information is from the same sound source; and generate a new identification information by associating the new ID with the plurality of newly generated identification elements, wherein the plurality of identification elements includes an identification element composed of a knowledge element, a possession element, and a biological element, in addition to an identification element generated based on the sound information.

* * * * *